United States Patent [19]

Kyushima et al.

[11] Patent Number: 5,393,278
[45] Date of Patent: Feb. 28, 1995

[54] SHIFT CONTROL APPARATUS FOR SHIFTING UP TRANSMISSION UPON RE-ACCELERATION FOLLOWING DECELERATION OF VEHICLE

[75] Inventors: Tatsuo Kyushima, Okazaki; Masaharu Tanaka, Toyota, both of Japan

[73] Assignee: Toyota Jidosha Kabushiki Kaisha, Toyota, Japan

[21] Appl. No.: 53,390

[22] Filed: Apr. 28, 1993

[30] Foreign Application Priority Data

May 2, 1992 [JP] Japan ................................. 4-140059
May 2, 1992 [JP] Japan ................................. 4-140060

[51] Int. Cl.$^6$ .............................................. F16H 59/48
[52] U.S. Cl. ................................... 477/120; 477/905; 477/118
[58] Field of Search ............... 477/118, 119, 113, 120, 477/905

[56] References Cited

U.S. PATENT DOCUMENTS 4,829,435 5/1989 Isono .................................... 477/119
5,076,116 12/1991 Sasaki ................................... 477/120

FOREIGN PATENT DOCUMENTS 51-18574 6/1976 Japan .
59-140948 8/1984 Japan .

Primary Examiner—Edward K. Look
Assistant Examiner—James A. Larson
Attorney, Agent, or Firm—Oblon, Spivak, McClelland, Maier & Neustadt

[57] ABSTRACT

A shift control apparatus for an automatic transmission of a motor vehicle is disclosed. The shift control apparatus includes a shift control device for automatically shifting the transmission according to a predetermined shift control pattern, on the basis of a speed of the engine and a currently required output of the engine. When a vehicle driver operates to re-accelerate the vehicle after deceleration with the transmission shifted down to the low-speed gear position, the transmission is shifted up from the lower-speed gear position to the high-speed gear position having the smaller speed reduction ratio than the lower-speed gear position, if a predetermined period of time has not elapsed after the low-speed gear position is established. Also disclosed is a shift control apparatus including the same shift control device, wherein the engine idling speed is raised from a normal level up to an elevated level when an additional load is applied to the engine, and wherein a shift-down point of the engine speed in the shift control pattern is shifted, in response to a rise in the idling speed to the elevated level, from a first point corresponding the normal level of the idling speed up to a second point corresponding to the elevated level.

12 Claims, 9 Drawing Sheets

FIG. 2

| SHIFT POSITION | | C0 | C1 | C2 | B0 | B1 | B2 | B3 | F0 | F1 | F2 |
|---|---|---|---|---|---|---|---|---|---|---|---|
| P | PARKING | O | | | | | | | | | |
| R | REVERSE | O | | O | | | | O | | | |
| N | NEUTRAL | O | | | | | | | | | |
| D | 4TH GEAR | | O | O | O | | O | | | | |
| D | 3RD GEAR | O | O | O | | | O | | O | | |
| D | 2ND GEAR | O | O | | | | O | | O | O | |
| D | 1ST GEAR | O | O | | | | | | O | | O |
| 2 | 3RD GEAR | O | O | O | | | O | | O | | |
| 2 | 2ND GEAR | O | O | | | O | O | | | O | O |
| 2 | 1ST GEAR | O | O | | | | | | O | | O |
| 1 | 2ND GEAR | O | O | | | O | O | | O | O | |
| 1 | 1ST GEAR | O | O | | | | | O | O | | O |

SHIFT CONTROL APPARATUS FOR SHIFTING UP TRANSMISSION UPON RE-ACCELERATION FOLLOWING DECELERATION OF VEHICLE

BACKGROUND OF THE INVENTION

1. Field of the Invention

The present invention relates generally to a shift control apparatus for an automatic transmission of a motor vehicle, and more particularly to a technique for preventing a vehicle driver's feeling of an engine racing when the vehicle is re-accelerated after deceleration with the transmission shifted down to the lowest-speed gear position.

2. Discussion of the Prior Art

As an automatic transmission (abbreviated as AT) of a motor vehicle which is selectively placed in one of a plurality of gear positions, there is known an automatic transmission of the type which includes a low-speed gear position that is established by a shifting action including engagement of a one-way clutch, and a high-speed gear position that is established by engagement of a frictional coupling device. For controlling the automatic transmission of this type, there is proposed a shift control apparatus as disclosed in JP-B2-51-18574, which is equipped with shift control means for automatically shifting the automatic transmission according to a predetermined shift control pattern, on the basis of the rotating speed of the engine and a currently required output of the engine, in case that a vehicle speed sensor normally used for controlling the transmission fails to detect the running speed of the vehicle. The predetermined shift control pattern consists of a shift-up boundary line and a shift-down boundary line, which represent relationships between the engine speed and the opening angle of a throttle valve indicative of the currently required output of the engine. These boundary lines are determined such that the shift-up or shift-down engine speed increases as the throttle opening angle increases. In operation, the automatic transmission is shifted down to the next lower-speed gear position if a point indicative of the current engine speed and the current throttle opening is shifted across the shift-down boundary line, and is shifted up to the next higher-speed gear position if the above point is shifted across the shift-up boundary line.

With the known shift control apparatus utilizing the above-described shift control pattern for shifting the transmission on the basis of the throttle opening and the engine speed, the transmission is shifted down to the lower-speed gear position as the engine speed is lowered. For example, the transmission is shifted down to a 2nd-speed gear position established by engagement of a one-way clutch, when the vehicle is decelerated before it is stopped. During the vehicle deceleration with the transmission placed in the 2nd-speed position, the power of drive wheels is not transmitted to the engine through the one-way clutch, and the engine speed is rapidly lowered to its idling speed below a shift-down point on the shift-down boundary line. As a result, the transmission is further shifted down to the 1st-speed gear position. If the vehicle is re-accelerated by depressing the accelerator pedal following the deceleration thereof, the engine will race, that is, the speed of the engine will be increased from the idling speed to a level determined by the current vehicle speed and the currently selected gear position (speed reduction ratio) of the transmission, without the engine power being transmitted from the engine to the drive wheel. During this period, the engine is held in its racing state. This engine racing is unexpected to the vehicle driver.

When the load acting on the engine is increased due to an operation of an air conditioner or other auxiliary equipment, or when the engine is cold, a suitable idling speed control device is activated to raise the idling speed to a level which is higher by a given value than the normal idling speed. Therefore, the shift-down boundary line of the shift control pattern used in this case must be set such that the shift-down engine speed is higher than the raised idling speed. This arrangement permits the transmission to be shifted from the 2nd-speed position to the 1st-speed position at a relatively high shift-down point (engine speed) during deceleration of the vehicle. However, the racing of the engine undesirably continues for a significantly increased time, upon re-acceleration of the vehicle, namely, until the one-way clutch is engaged to transmit the power from the engine to the drive wheels. This prolonged engine racing is unexpected and uncomfortable to the driver.

SUMMARY OF THE INVENTION

It is therefore an object of the present invention to provide a shift control apparatus for an automatic transmission of a motor vehicle, which reduces a driver's feeling of racing of the engine when the vehicle is re-accelerated following its deceleration.

The above object may be accomplished according to one aspect of the present invention, which provides a shift control apparatus for an automatic transmission of a motor vehicle having an engine, including shift control means for automatically shifting the automatic transmission according to a predetermined shift control pattern, on the basis of a speed of the engine and a currently required output of the engine, the automatic transmission being placed in a selected one of a plurality of gear positions which include a low-speed gear position that is established by a shifting action including engagement of a one-way clutch, and a high-speed gear position that is established by a shifting action including engagement of a frictional coupling device, the low-speed gear position having a larger speed reduction ratio than the high-speed gear position, wherein the improvement comprises: (1) judging means for determining whether or not a period of time which has elapsed after the low-speed position of the automatic transmission is established during deceleration of the motor vehicle is within a predetermined period; (2) detector means for detecting a vehicle driver's operation for accelerating the vehicle; and (3) shift-up means for shifting up the automatic transmission from the low-speed position to the high-speed gear position, when the vehicle driver's operation for accelerating the vehicle is detected by the detector means within the predetermined period.

In the shift control apparatus constructed as described above according to the present invention, the shift-up means is adapted to shift up the automatic transmission from the low-speed gear position to the high-speed gear position, if the vehicle driver's operation for accelerating the vehicle is detected by the detecting means, within the predetermined period of time measured from the moment of establishment of the low-speed position.

Accordingly, when the vehicle is re-accelerated after deceleration with the engine speed being lowered down to the idling speed with no power transmitted from drive wheels, the automatic transmission is shifted up by the shift-up means to the high-speed gear position having the smaller speed reduction ratio than the current low-speed gear position, so as to lower the engine speed at which the torque begins to be transmitted from the engine to the drive wheels. Consequently, the time period during which the engine races with no power transmitted is considerably reduced, and the vehicle can be re-accelerated in a short time as expected by the driver.

The same object of the invention may also be accomplished according to another aspect of the invention, which provides a shift control apparatus for an automatic transmission of a motor vehicle having an engine, including shift control means for automatically shifting the automatic transmission according to a predetermined shift control pattern, on the basis of a speed of the engine and a currently required output of the engine, the automatic transmission being placed in a selected one of a plurality of gear positions which include a low-speed gear position that is established by a shifting action including engagement of a one-way clutch, and a high-speed gear position that is established by a shifting action including engagement of a frictional coupling device, the low-speed gear position having a larger speed reduction ratio than the high-speed gear position, wherein the improvement comprises: (1) idling speed control means for raising an idling speed of the engine to an elevated level which is higher than a normal level by an amount determined by an additional load applied to the engine, the idling speed control means maintaining the idling speed at the normal level when the additional load is not applied to the engine; and (2) shift-down point changing means for shifting, in response to a rise in the idling speed to the elevated level by the idling speed control means, a shift-down point of the speed of the engine which is defined by the predetermined shift control pattern and at which the transmission is shifted down from the high-speed gear position to the low-speed gear position, from a first shift-down point corresponding to the normal level of the idling speed up to a second shift-down point corresponding to the elevated level.

In the shift control apparatus constructed as described above, the shift-down engine speed defined by the shift-down boundary line of the shift control pattern is shifted to a higher point corresponding to the elevated engine idling speed established by the idling speed control means. If the engine idling speed is returned to its normal level lower than the elevated level, the shift-down point is also returned to the original point corresponding to the normal or nominal engine idling speed.

Since the shift-down engine speed is shifted to the higher point as described above when the engine idling speed is raised by the idling speed control means, the automatic transmission can be surely shifted down to the 1st-speed gear position (low-speed gear position) before the vehicle is stopped after decelerated in the 2nd-speed gear position. Since the shift-down point of the control pattern is lowered down to the relatively low original point when the engine idling speed is controlled to the normal level, the racing of the engine occurs over a limited or narrowed range of the vehicle speed when the vehicle is re-accelerated after deceleration. Consequently, the driver is less likely to feel the racing of the engine.

BRIEF DESCRIPTION OF THE DRAWINGS

The above and other objects, features and advantages of the present invention will be better understood by reading the following detailed description of presently preferred embodiments of this invention, when considered in connection with the accompanying drawings, in which:

FIG. 2 is a view indicating the operating states of frictional coupling devices of the transmission, in relation to different gear positions of the automatic transmission of FIG. 1;

DETAILED DESCRIPTION OF THE PREFERRED EMBODIMENT

Figure 1:
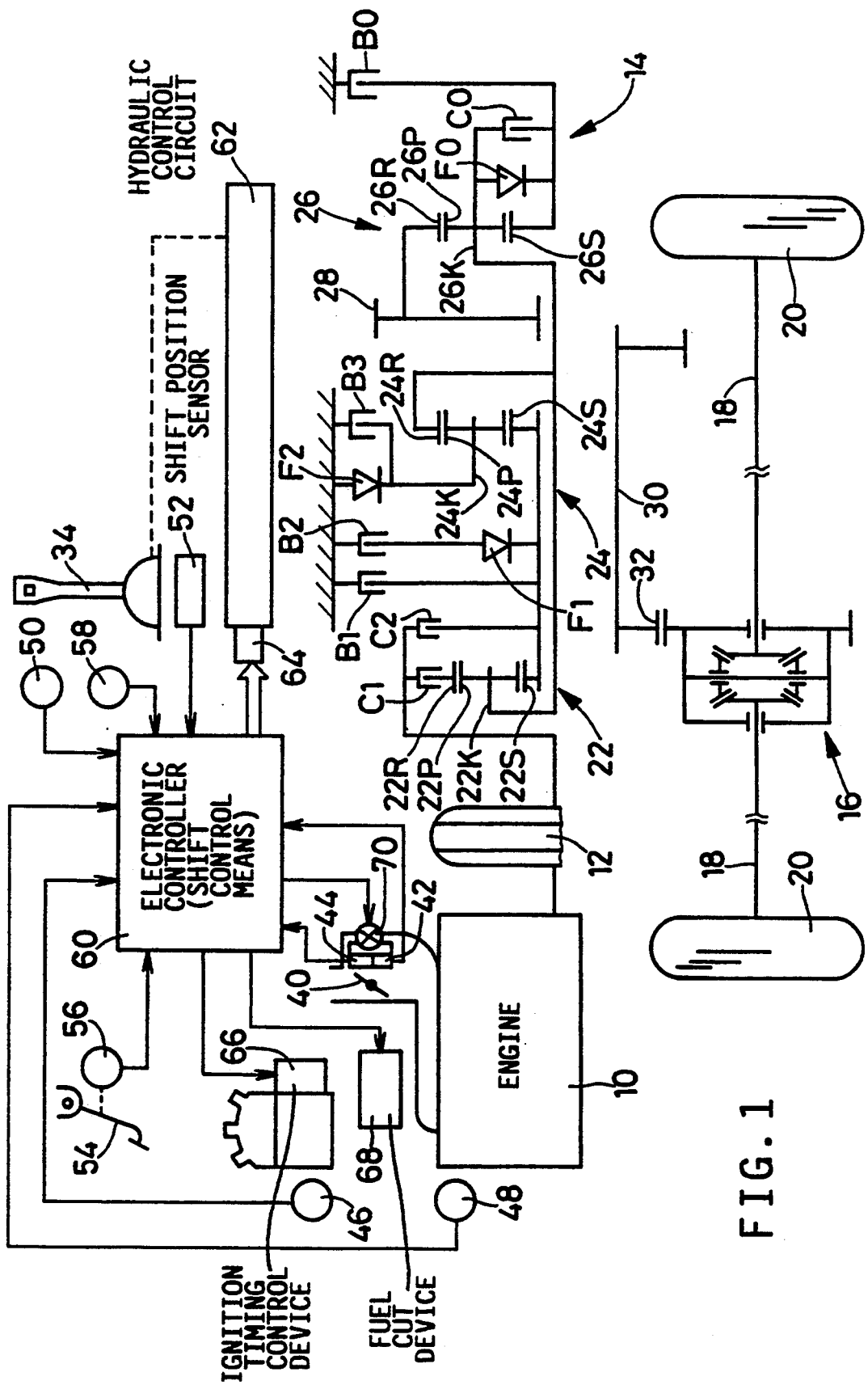
FIG. 1 is a schematic view showing a power transmitting system of a motor vehicle including an automatic transmission equipped with one embodiment of a shift control apparatus of the present invention.

Referring first to FIG. 1, there are schematically shown a power transmitting system including an automatic transmission disposed in a transverse transaxle for an FF (front engine front drive) vehicle, and a control apparatus constructed according to one embodiment of the present invention, for controlling the automatic transmission. The vehicle has an engine 10, and drive wheels 20 connected to drive shafts 18. The power of the engine 10 is transmitted to the drive wheels 20, through a torque converter 12 equipped with a lock-up clutch, the automatic transmission 14, a differential gear device 16 and the drive shafts 18.

The automatic transmission 14 has a structure similar to that of a widely known A140E type automatic transmission available from Toyota Jidosha Kabushiki Kaisha, for example. More specifically, the transmission 14 includes: a first planetary gear assembly 22; a second planetary gear assembly 24; a third planetary gear assembly 26; a counter drive gear 28; a countershaft 30 which is rotated by the counter drive gear 28; and an output gear 32 for transmitting power from the countershaft 30 to the differential gear device 16.

The first planetary gear assembly 22 includes a sun gear 22S, a ring gear 22R, a carrier 22K, and a planetary gear 22P which is rotatably supported by the carrier 22K and which meshes with the sun gear 22S and ring gear 22R. The second planetary gear assembly 24 includes a sun gear 24S, a ring gear 24R, a carrier 24K, and a planetary gear 24P which is rotatably supported by the carrier 24K and which meshes with the sun gear 24S and ring gear 24R. Similarly, the third planetary gear assembly 26 includes a sun gear 26S, a ring gear 26R, a carrier 26K, and a planetary gear 26P which is rotatably supported by the carrier 26K and which meshes with the sun gear 26S and ring gear 26R. The counter drive gear 28 is fixedly connected to the ring gear 26R of the third planetary assembly 26.

The automatic transmission 14 further includes a clutch C0, a clutch C1, a clutch C2, a brake B0, a brake B1, a brake B2, and a brake B3, each of which is a hydraulically operated frictional coupling device, and a one-way clutch F0, a one-way clutch F1 and a one-way clutch F2. These clutches C0, C1, C2, brakes B0, B1, B2 and one-way clutches F0, F1 and F2 are selectively placed in the engaged or operated state as indicated by "o" marks in FIG. 2, to connect appropriate ones of the above components or elements of the first, second and third planetary gear assemblies 22, 24, 26, so as to establish a desired one of gear positions or operating positions of the transmission 14.

When a shift lever 34 is placed in a DRIVE (D) position, four forward drive positions (1st-speed, 2nd-speed, 3rd-speed, and 4th-speed or overdrive) are selectively established. The 1st-speed position is established when the clutches C0 and C1 are engaged, and the 2nd-speed position is established when the clutches C0 and C1 and the brake B2 are engaged, while the 3rd-speed position is established when the clutches C0, C1 and C2 and the brake B2 are engaged, and the 4th-speed (overdrive) position is established when the clutches C1 and C2 and the brakes B0 and B2 are engaged. The 1st-speed position has the largest speed reduction ratio $\gamma$ (Nin/Nout), and the 4th-speed position has the smallest speed reduction ratio, where Nin and Nout represent the input and output speeds of the transmission 14, respectively.

When the automatic transmission 14 is placed in the 1st-speed position, or in the 2nd-speed position having a smaller speed reduction ratio $\gamma$ than the 1st-speed position, the one-way clutch F2 or F1 is engaged to transmit the power of the engine 10 to the wheels 20 while the vehicle is running in the positive torque condition wherein the torque is transmitted from the engine 10 to the drive wheels 20. When the 1st-speed position or the 2nd-speed position is established while the vehicle is running in the negative torque condition wherein the torque is transmitted from the drive wheels 20 to the engine 10, the one-way clutch F2 or F1 is not able to transmit the power from the wheels 20 to the engine 10. Consequently, an engine brake is not applied to the vehicle, and the rotating speed of the engine is rapidly lowered toward the engine idling speed. Namely, when a product of a speed Ne of the engine 10 and a slip ratio Rs of the torque converter 12 is larger than a product of the rotating speed Nout of an output shaft of the automatic transmission 14 and the speed reduction ratio $\gamma$ of the currently established gear position of the transmission 14, i.e., when the formula (1) indicated below is satisfied, the vehicle is held in the positive torque condition so that the power of the engine 10 is transmitted to the drive wheels 20. When the product of the speed Ne of the engine 10 and the slip ratio Rs of the torque converter 12 is smaller than the product of the output shaft rotating speed Nout of the transmission 14 and the speed reduction ratio $\gamma$ of the current gear position of the transmission 14, i.e., when the formula (2) indicated below is satisfied, the vehicle is held in the negative torque condition, whereby the engine 10 is caused to race.

$$Ne \times Rs > Nout \times 4 \qquad (1)$$

$$Ne \times Rs < Nout \times 4 \qquad (2)$$

Referring back to FIG. 1, the vehicle further includes: an engine idling switch 42 disposed adjacent to a throttle valve 40 in an intake pipe of the engine 10, for generating an ENGINE IDLE signal indicating that the throttle valve 40 is in the ENGINE IDLE or fully closed position; throttle sensor 44 disposed adjacent to the throttle valve 40, for generating an output signal indicative of the opening angle (%) of the throttle valve 40; engine speed sensor 46 for generating an output signal indicative of the speed Ne of the engine 10 (hereinafter referred to as "engine speed Ne"); water temperature sensor 48 for generating an output signal indicative of a temperature Tw of a coolant for the engine 10; vehicle speed sensor 50 disposed in a speedmeter (not shown), for generating an output signal indicative of a running speed V of the vehicle; shift position sensor 52 disposed adjacent to the shift lever 34, for generating an output signal indicative of the currently selected position Psh of the shift lever 34; brake switch 56 disposed adjacent to a brake pedal 54, for generating an output signal indicating that the brake pedal 54 is operated; and an air-conditioner switch 58 for generating an output signal representative of the on-off states of an air conditioner of the vehicle. These output signals generated by the above-indicated sensors 44, 46, 48, 50, 52 and switches 42, 56, 58 are applied to an electronic controller 60 as described below.

The electronic controller 60 is a so-called microcomputer, which incorporates a central processing unit (CPU), a random-access memory (RAM), a read-only memory (ROM), and interface circuits, as well known in the art. The CPU operates to process the signals received from the above sensors and switches, according to control programs and maps stored in the ROM, while utilizing a temporary data storage function of the RAM, and apply a shift command for automatically shifting the gear positions of the automatic transmission 14, to a solenoid-operated valve device 64 of a hydraulic control circuit 62 for the transmission 14. At the same time, the CPU applies a lag command to an ignition timing control device 66, and applies a FUEL CUT INHIBIT command, to a well-known fuel cut device 68 which is adapted to stop the supply of the fuel when the engine speed Ne is higher than a predetermined value with the throttle valve 40 being fully closed (the throttle opening being 0%). The solenoid-operated valve device 64 is adapted to selectively operate the hydraulically operated frictional coupling devices, i.e., the clutches C0, C1 and C2 and the brakes B0, B1, B2 and B3, according to a shift command received from the electronic controller 60. This device 64 includes two solenoid-operated control valves having four combinations of their on-off states for shifting the gear positions of the transmission 14, and a clutch control valve for controlling the engagement and release of the lock-up clutch in the torque converter 12. The hydraulic control circuit 62 is similar in construction to a widely known hydraulic control circuit used in the A140E type automatic transmission available from Toyota Jidosha Kabushiki Kaisha.

Figure 3:
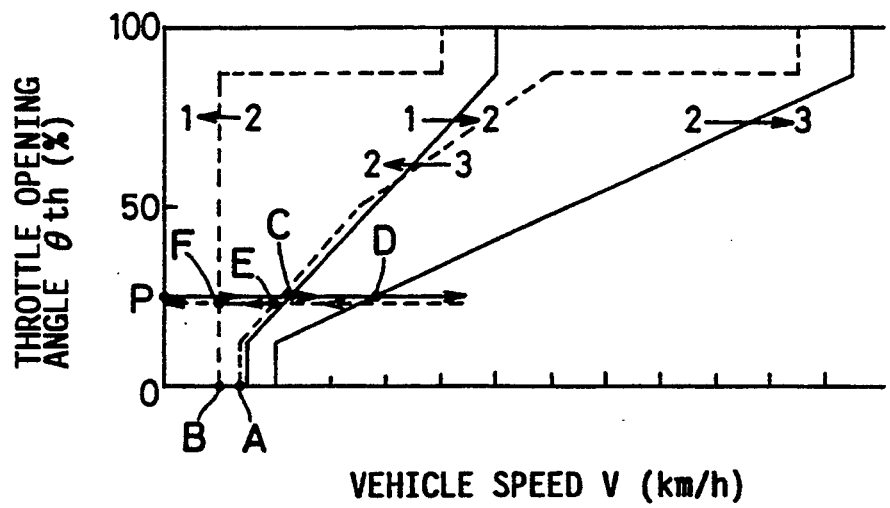
FIG. 3 is a view showing a shift control pattern used by an electronic controller of the shift control apparatus of FIG. 1, for shifting the automatic transmission when a vehicle speed sensor is not at fault.
Figure 4:
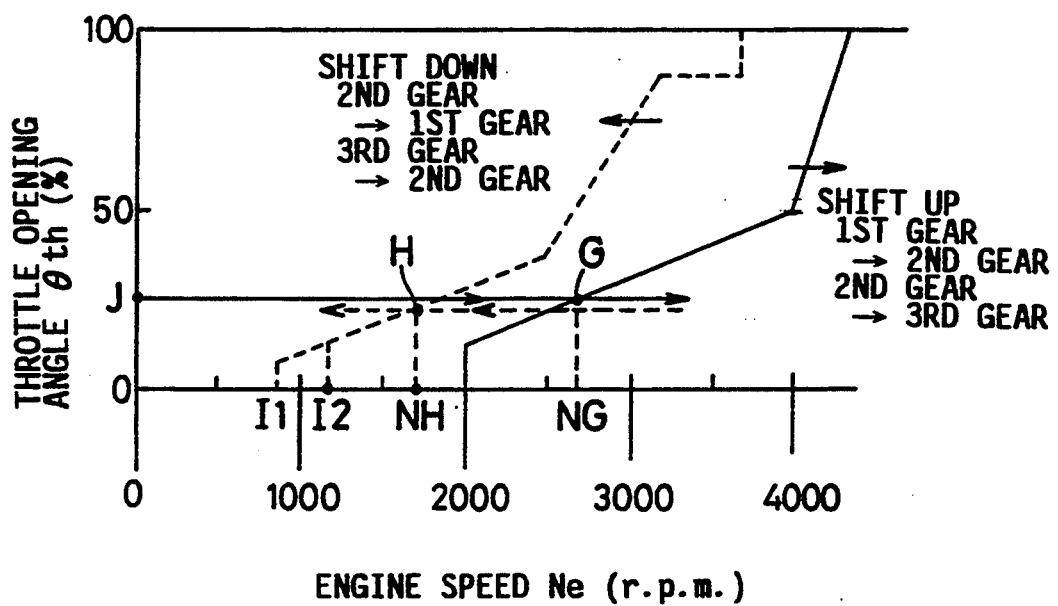
FIG. 4 is a view showing a back-up shift control pattern used by the electronic controller, for shifting the transmission when the vehicle speed sensor is at fault.

The electronic controller 60 stores a first transmission shift control pattern for normal use, as shown in FIG. 3, which consists of a plurality of shift-up and shift-down boundary lines that are associated with the respective gear positions (the 1st- to 3rd-speed positions) of the transmission 14. As indicated in the graph of FIG. 3, the shift-up and shift-down boundary lines of the first shift control pattern represent respective relationships between the vehicle speed V and the throttle opening $\theta$th representative of the currently required output of the engine 10. The controller 60 also stores a second shift control pattern for back-up use, as shown in FIG. 4, which consists of a shift-up boundary line used for shifting the transmission 14 from the currently selected position up to the next higher-gear position, and a shift-down boundary line used for shifting the transmission 14 from the current position down to the next lower-gear position. These boundary lines of FIG. 4 represent respective relationships between the engine speed Ne and the throttle opening $\theta$th. The first transmission shift control pattern is used when the vehicle speed sensor 50 is normally functioning, while the second shift control pattern is used when the sensor 50 is faulty or not normally functioning. When the controller 60 adapted to execute a fail detecting routine (not shown) determines that the vehicle speed sensor 50 is not at fault, namely, is in its normal condition, a determination as to whether the transmission 14 should be shifted up or shifted down is made on the basis of the vehicle speed V and the throttle opening $\theta$th, according to the first shift control pattern shown in FIG. 3, and an appropriate shift command is applied to the solenoid-operated valve device 64, so as to establish the thus determined gear position of the transmission 14. In the event that the controller 60 determines that the vehicle speed sensor 50 is at fault, the determination on the shifting action of the transmission 14 is made on the basis of the engine speed Ne and the throttle opening $\theta$th, according to the second shift control pattern shown in FIG. 4, and an appropriate shift command is applied to the valve device 64 so as to establish the thus determined gear position of the transmission 14. In the above-indicated fail detecting routine, the controller 60 determines that the vehicle speed sensor 50 is at fault when the sensor 50 does not generate any output pulse for a predetermined period of time while the engine speed Ne is higher than a predetermined value.

When an additional load is applied to the engine 10 while it is idling, due to an operation of the air conditioner or other auxiliary equipment, or due to a low operating temperature of the engine (upon starting of the cold engine), the electronic controller 60 performs an IDLE UP control for controlling an idling speed control valve 70 adapted to control an amount of the intake air supplied to the engine 10, so that the idling engine speed is raised to an elevated level $N_{idleup}$ which is about 200 r.p.m. higher than the ordinary or normal idling speed. The operating temperature of the engine below a predetermined lower limit may be detected by sensing the temperature of the engine coolant.

Referring next to the flow charts of FIGS. 5 and 6, there will be described a shift control routine which is implemented by the electronic controller 60, for controlling the transmission 14 during coast-down running of the vehicle with the shift lever 34 placed in the DRIVE position (D). This shift control routine is used when the vehicle speed sensor 50 is found to be at fault, so that the transmission 14 is shifted down according to the shift-down boundary line of the second shift control pattern of FIG. 4.

Initially, step S1 is executed to determine whether the engine idling switch 42 and the brake switch 56 are both in the ON states, in other words, whether the vehicle is decelerated in a coast-down mode with the throttle opening $\theta$th being substantially 0% (the throttle valve 40 being almost fully closed) and with the brake pedal 54 being operated. If an affirmative decision (YES) is obtained in step S1, step S2 is executed to apply the FUEL CUT INHIBIT command to the fuel cut device 68 indicated above, for inhibiting the fuel cut control in which the fuel supply to the engine 10 is stopped while the vehicle is coasting with the throttle valve 40 being fully closed (the throttle opening being 0%) and the engine speed Ne being higher than a predetermined value. This step S2 is provided to inhibit the fuel cut control so that the engine speed Ne is naturally lowered, otherwise the CPU cannot determine whether or not the reduction of the engine speed Ne is due to the fuel cut control.

Step S2 is followed by step S3 in which the CPU determines whether the IDLE UP control for controlling the idling speed depending upon the load applied to the engine 10 should be implemented or not. This determination is made by determining whether an output signal is received from the air-conditioner switch 58 or not.

If a negative decision (NO) is obtained in step S3, the control flow goes to step S5, without executing step S4. If an affirmative decision (YES) is obtained in step S3, on the other hand, step S4 is executed to change a shift point constant in the shift control pattern of FIG. 4. Namely, a shift-down point $I_1$ on the shift-down boundary line in the shift control pattern of FIG. 4, which point represents the shift-down engine speed Ne when the throttle opening $\theta$th is substantially 0%, is usually set to be around 800 r.p.m. With the IDLE UP control operation executed, however, the shift-down point $I_1$ is changed to a shift-down point $I_2$ which is slightly higher than the elevated idling speed $N_{idleup}$ as described above. For instance, the shift-down point $I_2$ is set to be around 1100 r.p.m. In this arrangement, the vehicle is decelerated in the IDLE UP control mode, so that the automatic transmission 14 can be shifted down to the 1st-speed gear position without fail, before the vehicle is stopped, whereby the vehicle can be re-accelerated with a sufficiently large drive force, thereby eliminating the vehicle driver's feeling of slow acceleration or poor drivability. If step S4 is skipped, that is, the IDLE UP control is not executed, on the other hand, the vehicle once decelerated can be re-accelerated without racing of the engine 10.

Step S4 is followed by step S5 to determine whether the automatic transmission 14 is currently placed in the 4th-speed gear position or not. This determination is made based on the last shift command which has been applied to the solenoid-operated valve device 64. If an affirmative decision (YES) is obtained in step S5, step S6 is executed to determine whether the transmission 14 which is currently placed in the 4th-speed position should be shifted down or not, according to the shift-down boundary line in the shift control pattern of FIG. 4, for example. If a negative decision (NO) is obtained in step S6, one cycle of execution of the shift control routine as shown in FIGS. 5 and 6 is completed. If an affirmative decision (YES) is obtained in step S6, the control flow goes to step S7 to determine whether a predetermined stand-by time Tt has elapsed after an affirmative decision (YES) is obtained in step S6, that is, after the determination that the transmission 14 should be shifted from the 4th-speed position down to the 3rd-speed position or the 2nd-speed position. If a negative decision (NO) is obtained in step S7, the present cycle of the routine is completed. If an affirmative decision (YES) is obtained in step S7, step S8 is executed to apply an appropriate shift command to the solenoid-operated valve device 64, so that the transmission 14 which has been placed in the 4th-speed position is shifted down to the 3rd-speed position, for example. Then, the present cycle of the control routine is completed.

If a negative decision (NO) is obtained in the above step S5, namely, if the CPU determines that the currently selected position of the transmission 14 is not the 4th-speed position, the control flow goes to step S9 to determine whether the transmission 14 is currently placed in the 3rd-speed position or not, based on the shift command which has been applied to the solenoid-operated valve device 64. If an affirmative decision (YES) is obtained in step S9, step S10 is executed to determine whether the transmission 14 which is currently placed in the 3rd-speed position should be shifted down or not, according to the shift-down boundary line in the shift control pattern of FIG. 4, for example. If a negative decision (NO) is obtained in step S10, the present cycle of the routine is completed. If an affirmative decision (YES) is obtained in step S10, the control flow goes to step S11 to determine whether the predetermined stand-by time Tt has elapsed after an affirmative decision (YES) is obtained in step S10, that is, after the determination that the transmission 14 should be shifted from the 3rd-speed position down to the 1st-speed position or the 2nd-speed position. If a negative decision (NO) is obtained in step S11, the present cycle of the routine is completed. If an affirmative decision (YES) is obtained in step S11, step S12 is executed to apply an appropriate shift command to the solenoid-operated valve device 64, so that the transmission 14 which is currently placed in the 3rd-speed position is shifted down to the 1st-speed position, for example. Step S12 is followed by step S13 in which a flag A is set to "1", and the present cycle of the shift control routine is then completed. This flag A is set at "1" during a period after the transmission 14 is shifted down to the 1st-speed position and before an accelerator pedal is depressed or the brake pedal 54 is released, namely, until a negative decision (NO) is obtained in step S1 indicated above.

In the above steps S6–S8 and steps S10–S12, the shift command is actually generated the predetermined stand-by time Tt after the CPU determines that the automatic transmission 14 should be shifted down. This stand-by time Tt stored in the ROM of the controller 60 is determined so as to minimize an amount of increase of the engine speed due to racing of the engine 10, when the vehicle is re-accelerated following deceleration with the brake operated. For instance, the stand-by time Tt is set to be about 2 seconds.

If a negative decision (NO) is obtained in the above step S9, namely, if the CPU determines that the currently selected position of the transmission 14 is not the 3rd-speed position, the control flow goes to step S14 to determine whether the transmission 14 is currently placed in the 2nd-speed position or not, based on the last shift command which has been applied to the solenoid-operated valve device 64. If an affirmative decision (YES) is obtained in step S14, step S15 is executed to determine whether or not the transmission 14 should be shifted down from the 2nd-speed position, according to the shift-down boundary line in the shift control pattern of FIG. 4, for example. If a negative decision (NO) is obtained in step S15, the present cycle of the routine is completed. If an affirmative decision (YES) is obtained in step S15, the control flow goes to step S16 in which an appropriate shifting command is applied to the solenoid-operated valve device 64, whereby the transmission 14 is shifted from the 2nd-speed position to the 1st-speed position. Subsequently, step S17 is implemented to set the flag A to "1", and the present cycle of the routine is completed.

If a negative decision (NO) is obtained in the above step S14, namely, if the CPU determines that the currently selected position of the transmission 14 is not the 2nd-speed position, step S18 is executed to determine whether a predetermined threshold time Tk has elapsed after the flag A is set to "1". If a negative decision (NO) is obtained in step S18, the present cycle of the routine is completed. If an affirmative decision (YES) is obtained in step S18, step S26 is implemented to reset the flag A to "0", and the present cycle of the routine is completed. When the time measured from the moment of shifting of the transmission 14 to the 1st-speed position is equal to or exceeds the predetermined threshold time Tk, it is normally estimated that the vehicle is at stop or is about to stop. Thus, the threshold time Tk is used for determining whether or not the vehicle is in such a condition that does not require a shift-up operation as described later according to the present invention when the vehicle is re-accelerated. For instance, the threshold time Tk is set to be about 2 to 4 seconds.

If a negative decision (NO) is obtained in step S1, namely, if the CPU determines that the accelerator pedal is depressed or the brake pedal 54 is released, according to the driver's intention to re-accelerate the vehicle which has been decelerated, the control flow goes to step S19 to determine whether the automatic transmission 14 is currently placed in the 1st-speed position or not. If a negative decision (NO) is obtained in step S19, the present cycle of the control routine is completed. If an affirmative decision (YES) is obtained in step S19, step S20 is then executed to determine whether the flag A is set at "1" or not. If a negative decision (NO) is obtained in step S20, the present cycle of the control routine is completed. If an affirmative decision (YES) is obtained in step S20, step S21 is executed to determine whether or not the predetermined threshold time Tk has elapsed since the flag A is set to "1". If an affirmative decision (YES) is obtained in step S21, that is, if it is estimated that the vehicle is at stop, step S26 is implemented to set the flag A to "0", and the present cycle of the shift control routine is completed. These steps S21 and S26 are provided so as to prevent the stopped vehicle from re-starting with the transmission 14 placed in the 2nd-speed position which provides with a relatively small drive force.

If a negative decision (NO) is obtained in step S21, step S22 is executed to determine whether the throttle opening θth is rapidly changed or not. This determination is made, for instance, by determining whether a difference Δθth between the throttle opening θth detected in the previous cycle of the control routine and that detected in the current cycle of the routine exceeds a predetermined reference value B or not. This comparison of the throttle opening θth with the reference value B is made so as to determine whether the accelerator pedal is depressed so rapidly by the vehicle driver that the re-acceleration of the vehicle does not require the execution of step S24 to shift the transmission 14 to the 2nd-speed position, for reducing the racing of the engine 10. If an affirmative decision (YES) is obtained in step S22, the present cycle of the control routine is completed. If a negative decision (NO) is obtained in step S22, step S23 is executed to determine whether the throttle opening θth is larger than a predetermined reference value θa or not. This comparison of the throttle opening θth with the reference value θa is made to determine whether the vehicle driver desires such a high engine speed, upon re-acceleration of the decelerated vehicle, that the driver does not feel the racing of the engine 10 so seriously. The reference value θa may be set within a range of about 35-50%, for example.

If an affirmative decision (YES) is obtained in step S23, the present cycle of the control routine is completed. If a negative decision (NO) is obtained in step S23, it indicates that a depression of the accelerator pedal for re-acceleration of the vehicle causes the racing of the engine 10 which is uncomfortable to the driver. In this case, step S24 is executed to apply an appropriate shift command so that the transmission 14 is shifted from the 1st-speed gear position up to the 2nd-speed position. Step S24 is followed by step S25 in which the flag A is cleared, i.e., is reset to "0", and the present cycle of execution of the shift control routine is terminated.

It will be understood from the above description of the instant embodiment that step S21 corresponds to judging means for determining whether or not it is within the predetermined time Tk after the 1st-speed position (low-speed gear position) of the transmission 14 is established during a coast-down deceleration of the vehicle, and that step S1 corresponds to detector means for detecting an operation by the driver for accelerating the vehicle. If the accelerating operation is detected in step S1 and it is determined in step S21 that the time Tk has not elapsed after the establishment of the 1st-speed position, step S24 which corresponds to shift-up means is then executed for shifting up the transmission 14 from the 1st-speed position (low-speed gear position) to the 2nd-speed position (high-speed gear position). Accordingly, when the vehicle is re-accelerated after it is decelerated with the engine speed lowered to the normal engine idling speed or to the above-indicated elevated idling speed $N_{idleup}$ used in the IDLE UP control mode, the automatic transmission 14 is shifted up in step S24 from the 1st-speed position to the 2nd-speed position having the smaller speed-reduction ratio γ, whereby the engine speed at which the one-way clutch F1 is engaged to transmit power from the engine 10 to the drive wheels 20 is lowered. This considerably reduces a length of time during which the engine 10 is racing with no power transmitted therefrom, that is, a time necessary for the one-way clutch F1 to be engaged to drive the vehicle in the positive torque condition. Consequently, the vehicle driver is less likely to feel the racing of the engine 10.

It will be also understood from the above description of the instant embodiment that the idling speed control valve 70 corresponds to idling speed control means for controlling the engine idling speed depending upon a load applied to the engine 10, and that step S4 corresponds to shift-down point changing means for raising a shift-down engine speed (when the throttle opening θth is substantially 0%) on the shift-down boundary line of the shift control pattern of FIG. 4, to a higher point corresponding to the higher engine speed established by the control valve 70. That is, the shift point constant $I_1$ is changed to the higher shift point constant $I_2$ as indicated in the shift control pattern of FIG. 4. This also means that the shift-down point in the control pattern of FIG. 4 is returned to the original point $I_1$ if the engine idling speed is lowered to its normal value. Since the shift-down point is changed to the higher point in step S4 when the engine idling speed is raised by the idling speed control valve 70, the transmission 14 can be surely shifted down to the 1st-speed position when the vehicle is stopped after the deceleration. Therefore, the vehicle can be re-accelerated with a sufficiently large drive force with the transmission placed in the 1st-speed position. Further, since the shift-down point in the control pattern is returned to the original lower point when the idling speed control valve 70 is returned to the normal position, the racing of the engine 10 occurs in a limited or narrowed range of the vehicle speed when the vehicle is re-accelerated after the deceleration. Thus, the racing of the engine 10 is less likely to occur unexpectedly to the driver.

There will be hereinafter described in detail the effect of the instant embodiment of the invention, which is yielded when the automatic transmission 14 is shifted up from the 1st-speed position to the 2nd-speed position having the smaller speed-reduction ratio γ, upon re-acceleration of the vehicle which has been decelerated.

Initially, there will be described a normal shift control for the automatic transmission 14 when the vehicle is accelerated and decelerated with the throttle opening θth being constantly kept at 20%. In the shift control pattern of FIG. 3, the shift-up boundary lines are indicated by solid lines, while the shift-down boundary lines are indicated by broken lines. If the vehicle is accelerated from a point "P" in FIG. 3 at which the vehicle speed V is 0 km/h and the transmission 14 is placed in the 1st-speed position, to a shift-up point "C" (vehicle speed = $V_C$) on the 1→2 shift-up boundary line in FIG. 3, the transmission 14 is shifted up from the 1st-speed position to the 2nd-speed position. If the vehicle is further accelerated up to a shift-up point "D" (vehicle speed = $V_D$) on the 2→3 shift-up boundary line in FIG. 3, the transmission 14 is shifted up from the 2nd-speed position to the 3rd-speed position.

If the vehicle is decelerated to a shift-down point "E" (vehicle speed = $V_E$) on the 3→2 shift-down boundary line in FIG. 3, on the other hand, the transmission 14 is shifted down from the 3rd-speed position to the 2nd-speed position. If the vehicle is further decelerated to a shift-down point "F" (vehicle speed = $V_F$) on the 2→1 shift-down boundary line in FIG. 3, the transmission 14 is shifted down from the 2nd-speed position to the 1st-speed position.

Figure 7:
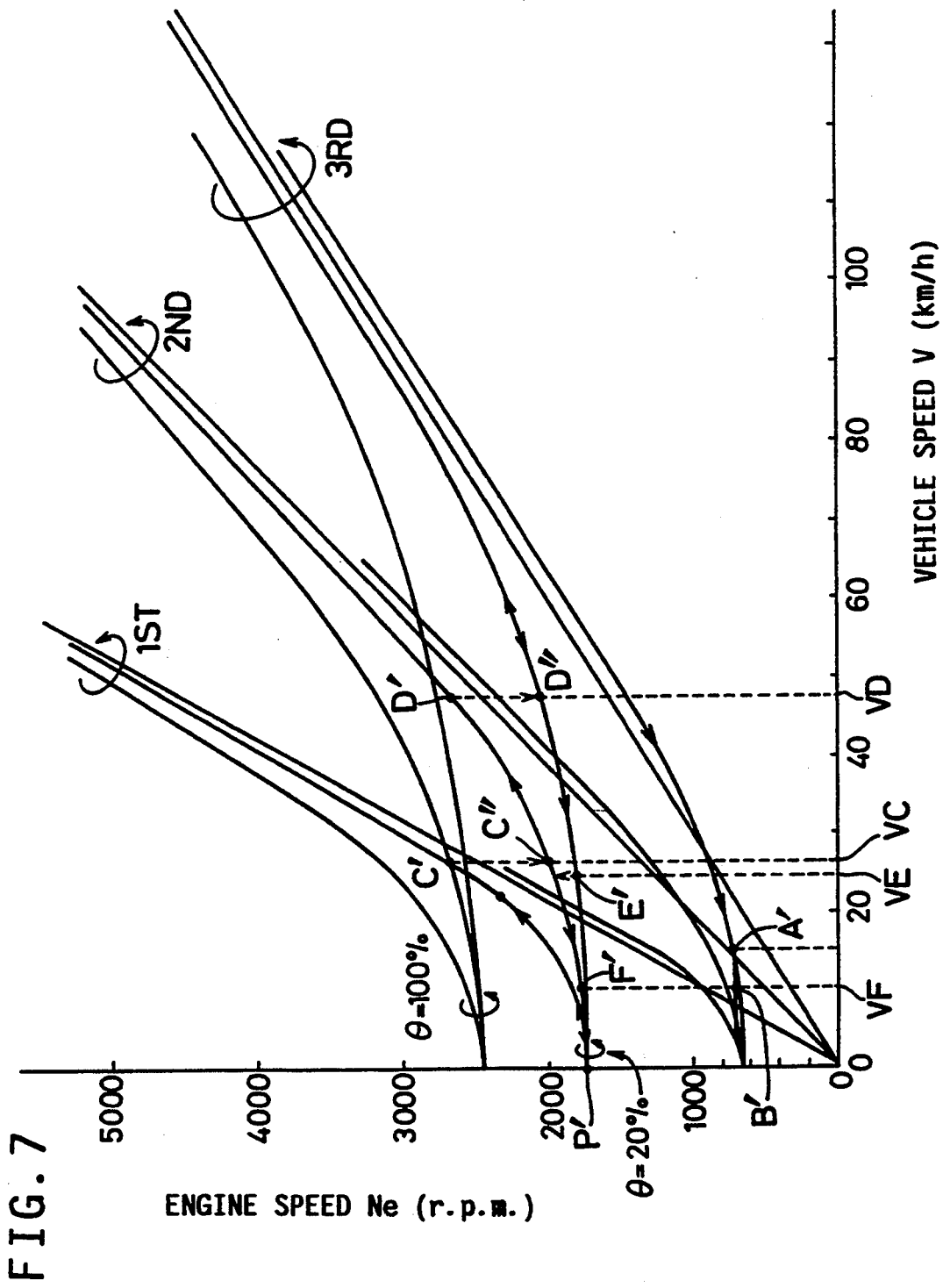
FIG. 7 is a graph showing the engine speed which is varied upon shifting of the transmission according to the shift control pattern for normal use as shown in FIG. 3.

The graph of FIG. 7 indicates the relationship between the vehicle speed V and the engine speed Ne during the acceleration and deceleration of the vehicle. If the vehicle is accelerated from a point P' in FIG. 7 with the transmission 14 being placed in the 1st-speed position, until the vehicle speed V reaches the above-indicated level $V_C$, the transmission 14 is shifted to the 2nd-speed position whereby the engine speed Ne is lowered from a point C' down to a point C" as indicated in FIG. 7. If the vehicle is further accelerated until the vehicle speed V reaches the above-indicated level $V_D$, the transmission 14 is shifted up from the 2nd-speed position to the 3rd-speed position, whereby the engine speed Ne is lowered from a point D' down to a point D" as also indicated in FIG. 7.

Figure 8:
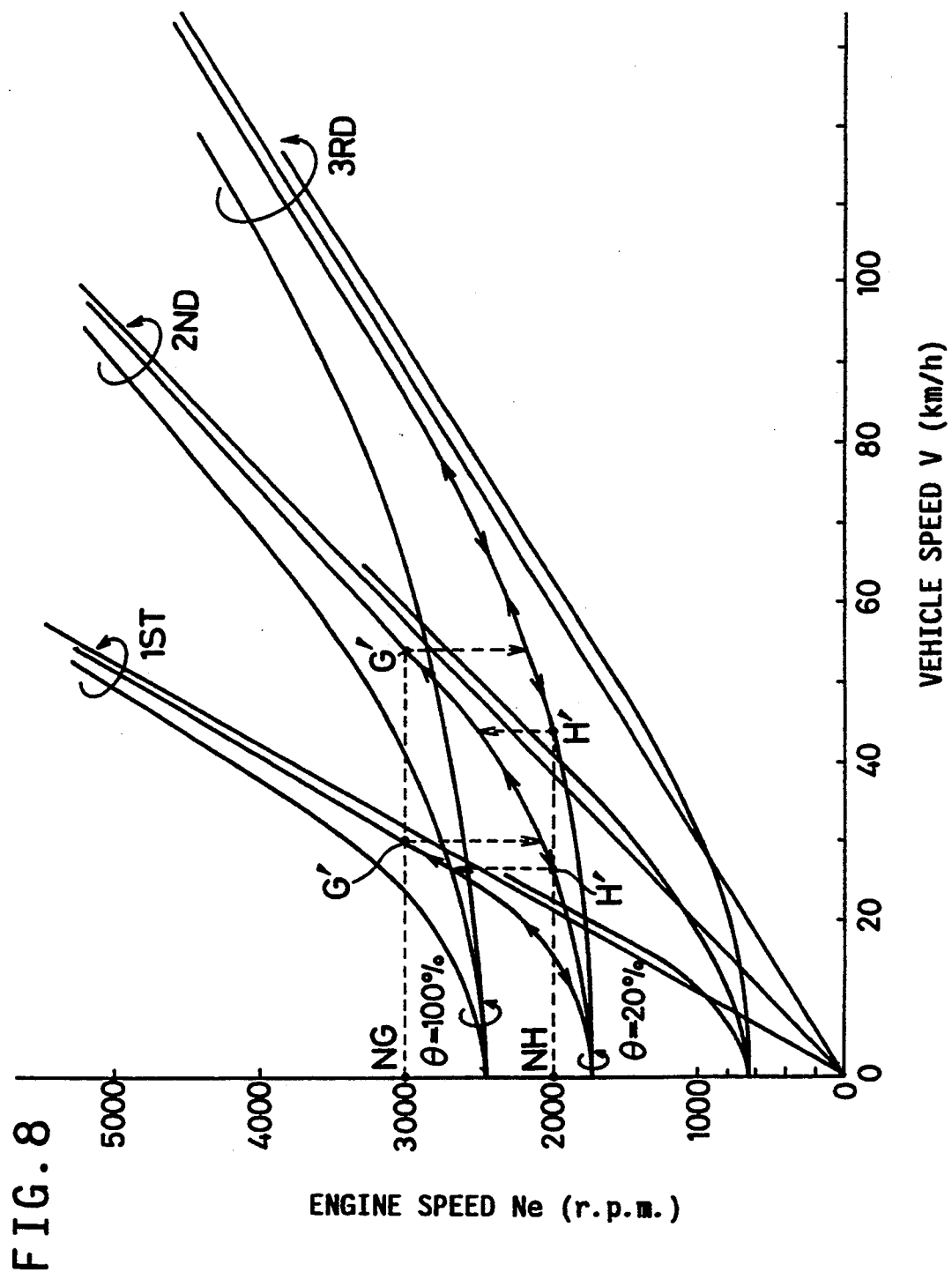
FIG. 8 is a graph showing the engine speed which is varied upon shifting of the transmission according to the shift control pattern for back-up use as shown in FIG. 4.

A similar shift control operation is effected even if the vehicle speed sensor 50 is at fault. In the shift control pattern of FIG. 4, the solid line indicates the shift-up boundary line between the adjacent gear positions, while the broken line indicates the shift-down boundary line between the adjacent gear positions. If the engine speed Ne exceeds a shift-up point G on the shift-up boundary line, for example, a shift command is generated so as to shift the transmission 14 from the currently selected position up to the next higher-gear position. If the engine speed Ne falls below a shift-down point H on the shift-down boundary line, for example, a shift command is generated so as to shift the transmission 14 from the current position down to the next lower-gear position. The graph of FIG. 8 indicates the relationship between the vehicle speed V and the engine speed Ne during the acceleration and deceleration of the vehicle. As in the case indicated in FIG. 7, the engine speed Ne is changed upon shifting of the transmission 14, as indicated by broken arrows in FIG. 8.

Figure 9:
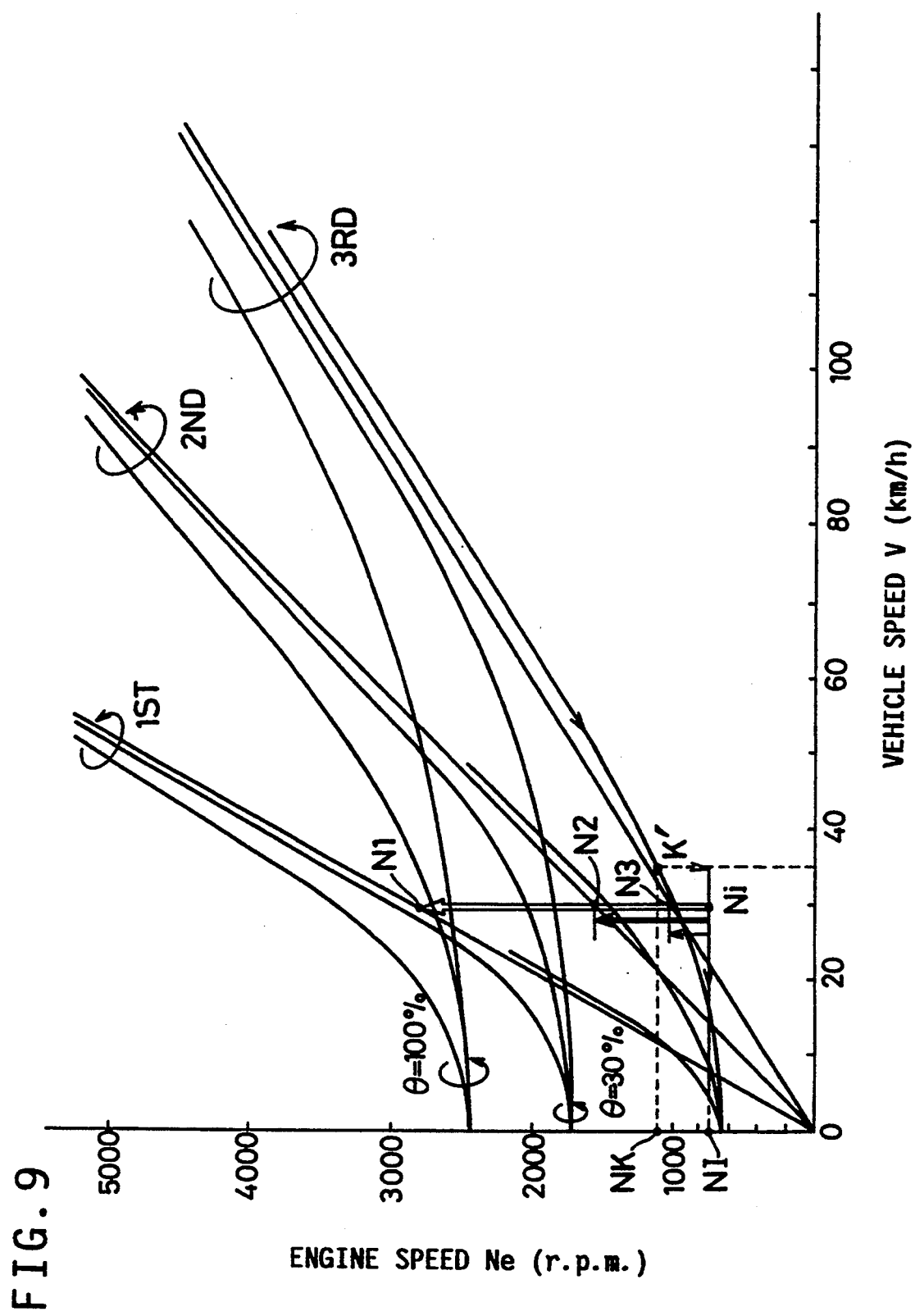
FIG. 9 is a graph showing the engine speed which is varied according to the shift control pattern of FIG. 4, when the vehicle is re-accelerated during its deceleration.

A similar shift control operation is effected when the vehicle is decelerated in the coast-down mode with the engine idling, i.e., with the throttle opening $\theta$th being substantially 0%. When the vehicle speed sensor 50 is in its normal state, the transmission 14 is shifted down from the 3rd- to 2nd-speed position and from the 2nd- to 1st-speed position, at respective points A and B in FIG. 3. When the vehicle speed sensor 50 is at fault, the transmission 14 is shifted from the 3rd- to 2nd-speed position and from the 2nd- to 1st-speed position, at the shift-down point $I_1$ or $I_2$ in FIG. 4. During the deceleration of the vehicle in the negative torque condition when the above-indicated formula (2) is satisfied, the engine speed Ne is rapidly lowered to the engine idling speed when the 2nd-speed or 1st-speed position is established, since the one-way clutch F1 or F2 is not able to transmit power in the reverse direction.

Where the shift control pattern of FIG. 4 for the back-up use is employed in the above-described conditions, the transmission 14 is shifted down to the 1st-speed gear position when the engine speed Ne falls below the shift-down point $I_1$ or $I_2$, during the deceleration of the vehicle, with the engine idling switch 42 and brake switch 56 being both in the ON states. If the vehicle driver depresses the accelerator pedal at the vehicle speed V of 30 km/h, for example, in an attempt for re-acceleration after the shifting of the transmission 14 to the 1st-speed position, the acceleration of the vehicle is commenced by engagement of the one-way clutch F2 only after the engine 10 has raced from the idling speed (point Ni) up to about 3000 r.p.m. (point $N_1$), as indicated by the white arrow in the graph of FIG. 9. This racing of the engine 10 is unexpected to the driver, and in some cases cause the driver to make a misjudgment that the vehicle is out of order.

In the instant embodiment, however, the above-indicated step S24 is implemented to shift the transmission 14 from the 1st-speed position up to the 2nd-speed position, in response to the driver's operation for re-acceleration. If the driver operates to re-accelerate the vehicle at the vehicle speed of 30 km/h, therefore, the engine speed Ne increases only up to a relatively low point $N_2$ of about 1500 r.p.m., as indicated by the black arrow in the graph of FIG. 9. In this case, the driver will not perceive the engine speed rise as the engine racing. If the present embodiment is modified to shift the transmission 14 from the 1st-speed position up to the 3rd-speed position in step S24, the engine speed $N_2$ just increases up to a still lower point $N_3$ of about 1000 r.p.m., as indicated by the fine black arrow in the graph of FIG. 9.

Further, the shift control routine of the instant embodiment includes the above-indicated step S4 wherein the shift point constant $I_1$ is changed to the higher shift point constant $I_2$ in the shift control pattern of FIG. 4, due to a rise in the idling speed of the engine 10 under the IDLE UP control as described above. Accordingly, the transmission 14 can be surely shifted down to the 1st-speed position during deceleration of the vehicle, before the vehicle is stopped. Accordingly, the vehicle can be re-accelerated with a sufficiently large drive force, with the transmission 14 in the 1st-speed position. When the above step S4 is skipped, that is, the IDLE UP control is not executed, on the other hand, the vehicle once decelerated can be re-accelerated without racing of the engine 10.

The instant shift control routine for controlling the transmission 14 in the coast-down mode also includes step S2 for inhibiting the fuel cut function. Where the shift control pattern of FIG. 4 for back-up use is employed upon the failure of the vehicle speed sensor 50, therefore, the transmission 14 can be surely shifted down to the 1st-speed gear position when the vehicle is stopped, thereby preventing the vehicle from re-starting with the transmission placed in the 2nd-speed position. At the same time, the racing of the engine 10 is prevented when the vehicle is re-accelerated following the deceleration thereof.

Figure 10:
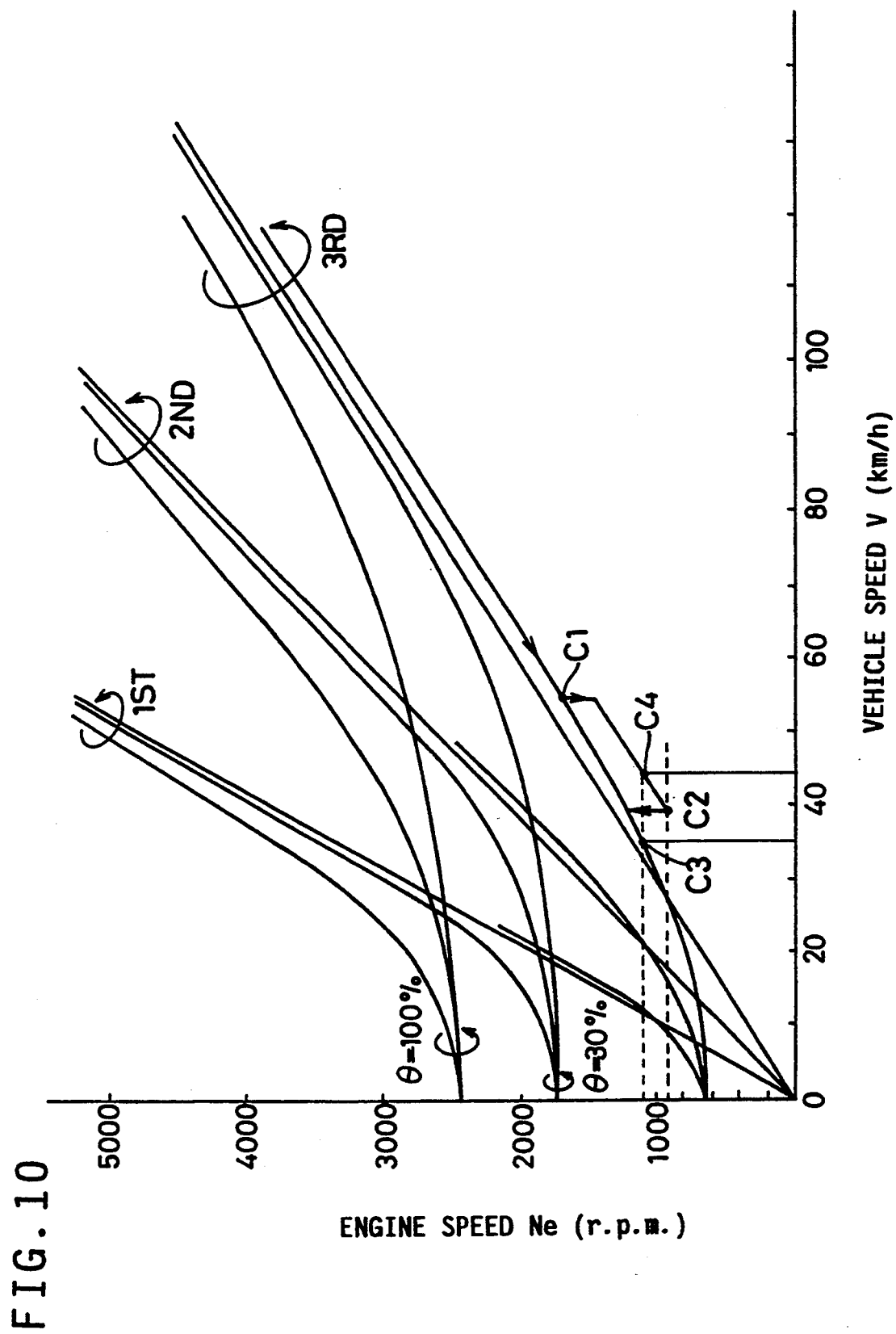
FIG. 10 is a graph showing a change in the engine idling speed upon execution of a fuel cut control during deceleration of the vehicle, while the transmission is shifted according to the shift control pattern of FIG. 4, for explaining an increased range of the vehicle speed in which racing of the engine takes place.

More specifically described referring to the graph of FIG. 10, the idling speed of the engine 10 is suddenly lowered at a point $C_1$ in FIG. 10 when the fuel cut is carried out during the deceleration of the vehicle, and is suddenly raised at a point $C_2$ in FIG. 10 when the fuel cut is ceased. For instance, the transmission 14 is shifted down at a point $C_3$, that is, at the vehicle speed V of around 35 km/h, if the fuel cut control is inhibited during the deceleration of the vehicle with the engine 10 in the idling state (i.e., with the throttle opening $\theta$th being 0%). If the engine idling speed is lowered due to the fuel cut, the transmission 14 is shifted down at a point $C_4$, that is, at the vehicle speed V of as high as around 45 km/h, resulting in an increased range of the vehicle speed V in which the racing of the engine 10 takes place upon re-acceleration of the vehicle. In the instant embodiment, this fuel cut control is inhibited during the coast-down deceleration of the vehicle, so as to eliminate the above problem.

Figure 5:
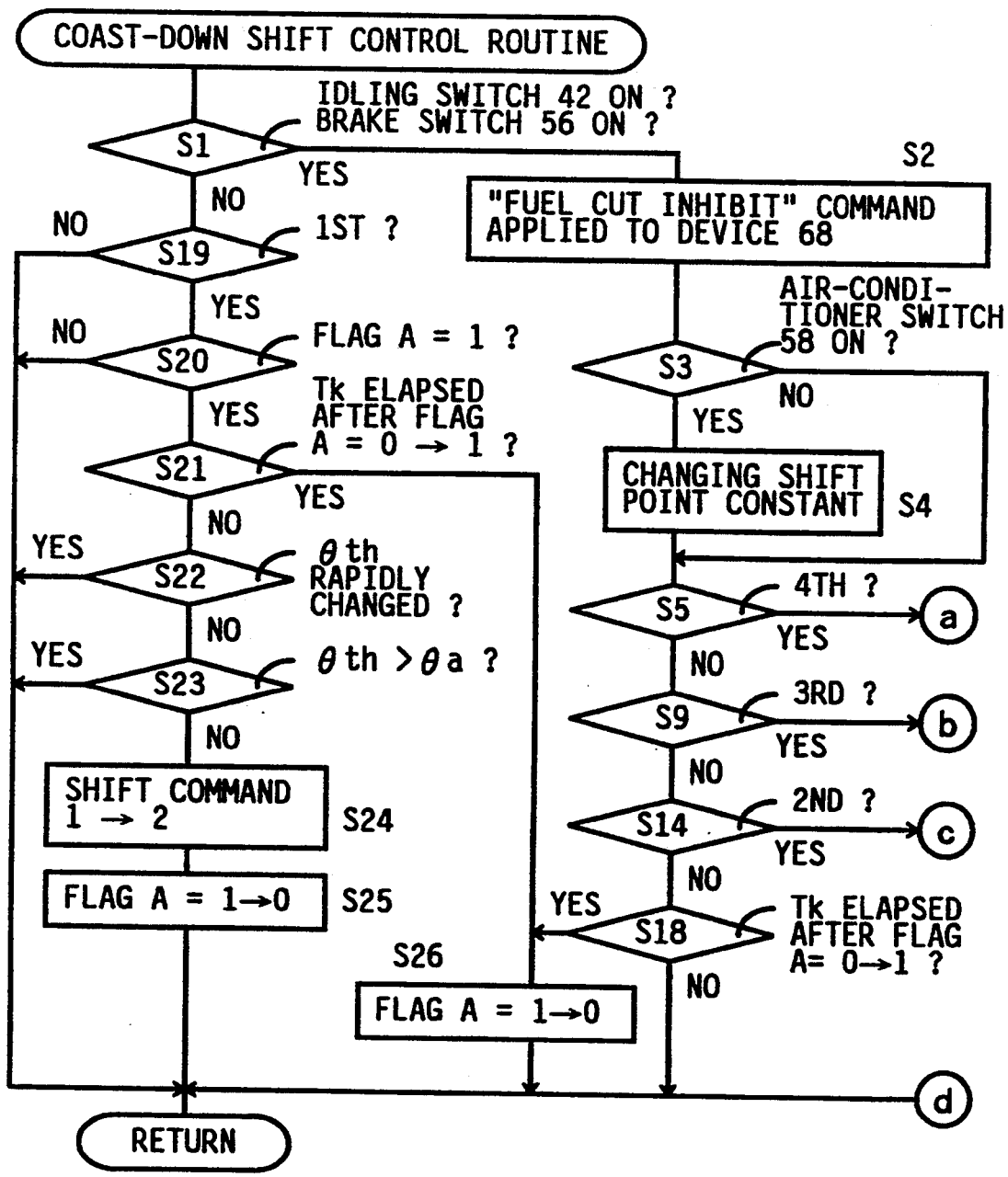
FIG. 5 is a flow chart illustrating a part of a shift control routine executed by the electronic controller of FIG. 1, for explaining a coast down shift operation of the transmission.
Figure 6:
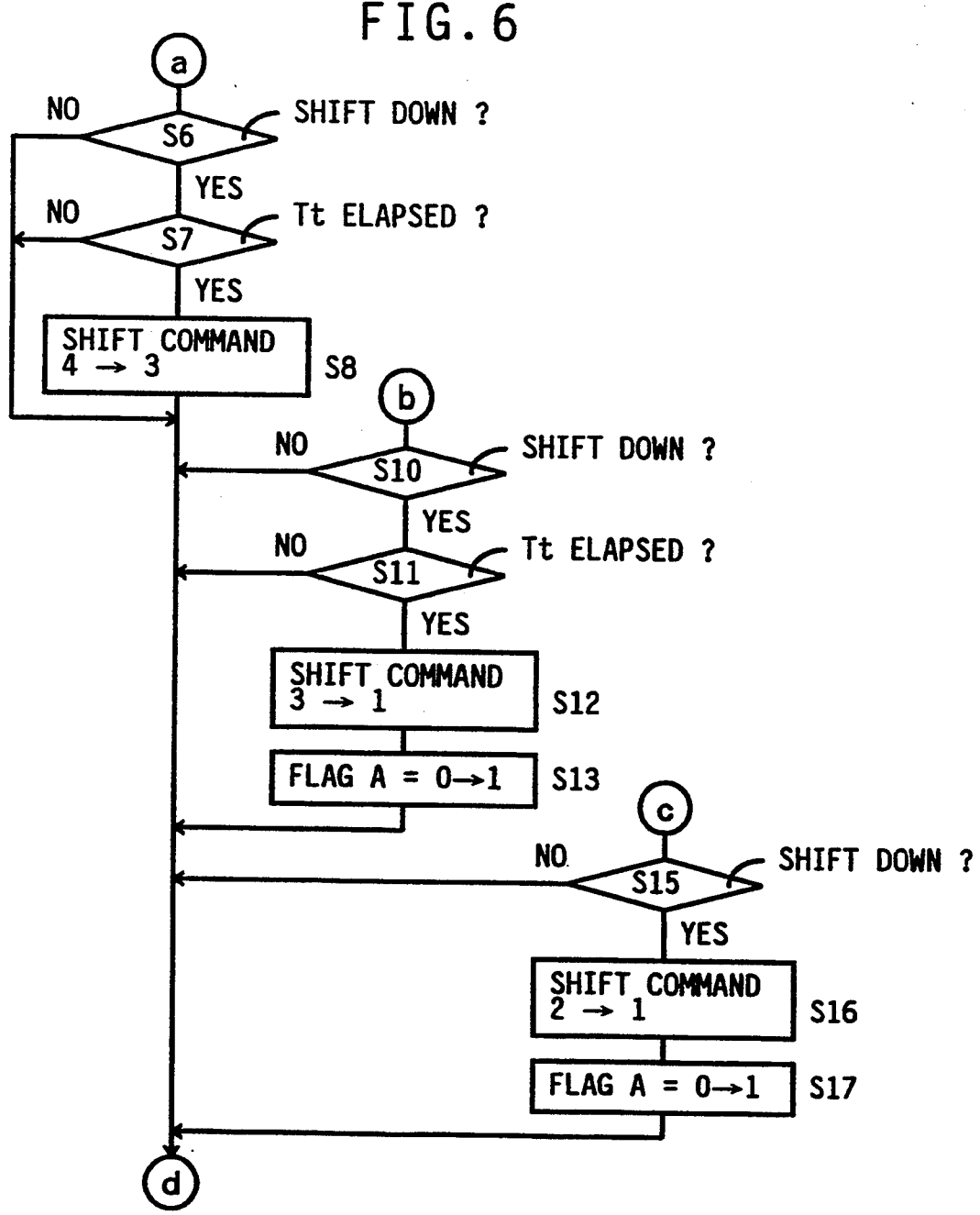
FIG. 6 is a flow chart illustrating another part of the shift control routine executed by the electronic controller of FIG. 1, for explaining the coast down shift operation of the transmission.

In the shift control routine of FIGS. 5 and 6, a shift command is actually generated in step S12 the predetermined stand-by time Tt after it is determined in step S10 that the transmission 14 should be shifted down from the 3rd-speed position to the 1st-speed position. This is advantageous in that an amount of increase of the engine speed Ne due to the racing of the engine 10 can be reduced to a minimum, when the vehicle is re-accelerated after it is decelerated with the brake operated.

While the present invention has been described in its presently preferred embodiment, for illustrative purpose only, it is to be understood that the invention is not limited to the details of the illustrated embodiment, but may be otherwise embodied.

While the transmission 14 is shifted up from the 1st-speed position to the 2nd-speed position in step S24 of the shift control routine of the illustrated embodiment, the transmission 14 may be shifted up from the 1st-speed position to the 3rd-speed position, so as to yield the same effects or advantages as described above.

In the illustrated embodiment, the shift control routine includes step S2 for inhibiting the fuel cut control prior to execution of the coast-down shift control of the transmission 14 using the second shift control pattern of FIG. 4 for back-up use. Instead of inhibiting the fuel cut control, step S2 may be replaced by a step which allows step S3 and the following steps to be executed only when the fuel cut is not practiced.

While the predetermined constant stand-by time Tt is used in steps S7 and S11 in the illustrated embodiment, the stand-by time Tt used may be changed as a function of the rate of change of the engine speed Ne which corresponds to the rate of deceleration of the vehicle.

In the illustrated embodiment, the transmission 14 is shifted up from the 1st-speed position to the 2nd-speed position in step S24 provided the CPU determines in step S1 that the engine idling switch 42 is in the OFF state. However, step S24 may be executed when the throttle opening θth, the rate of change of the throttle opening θth, or the rate of change of the engine speed Ne is larger or higher than a predetermined value.

While the throttle opening θth representative of a currently required output of the engine 10 is used as a parameter for the transmission shift control patterns as shown in FIGS. 3 and 4, the required output of the engine 10 may be represented by any other suitable parameter such as an amount of operation of the accelerator pedal, an amount of fuel injection, and an intake air quantity.

It is also to be understood that the present invention may be embodied with various other changes, modifications and improvements, which may occur to those skilled in the art, without departing from the spirit and scope of the invention defined in the following claims.

What is claimed is:

1. A shift control apparatus for an automatic transmission of a motor vehicle having an engine, including shift control means for automatically shifting the automatic transmission according to a predetermined shift control pattern, on the basis of a speed of said engine and a currently required output of the engine, the automatic transmission being placed in a selected one of a plurality of gear positions which include a low-speed gear position that is established by a shifting action including engagement of a one-way clutch, and a high-speed gear position that is established by a shifting action including engagement of a frictional coupling device, said low-speed gear position having a larger speed reduction ratio than said high-speed gear position, wherein the improvement comprises:

judging means for determining whether or not a period of time which has elapsed after said low-speed position of the automatic transmission is established during deceleration of the motor vehicle is within a predetermined period;

detector means for detecting a vehicle driver's operation for accelerating the vehicle; and shift-up means for shifting up the automatic transmission from said low-speed position to said high-speed gear position, when said vehicle driver's operation for accelerating the vehicle is detected by said detector means within said predetermined period.

2. A shift control apparatus according to claim 1, wherein said plurality of gear positions produce a plurality of speed reduction ratios, and wherein said low-speed gear position consists of a 1st-speed position having a largest speed reduction ratio of said plurality of speed reduction ratios and which is established before the vehicle is stopped, said high-speed gear position consisting of a 2nd-speed position which has the next smaller speed reduction ratio of said plurality of speed reduction ratios than the 1st-speed position, said shift-up means shifting up the automatic transmission from the 1st-speed position to the 2nd-speed position.

3. A shift control apparatus according to claim 1, wherein said predetermined period of time is set in a range of 2 to 4 seconds.

4. A shift control apparatus according to claim 1, wherein said detector means comprises an engine idling switch disposed adjacent to a throttle valve in an intake pipe of the engine, for generating an output signal indicating whether the throttle valve is in a fully closed position or not, and a brake switch disposed adjacent to a brake pedal of the vehicle, for generating an output signal indicating whether the brake pedal is operated or not, said vehicle driver's operation for accelerating the vehicle being detected on the basis of the output signal from said engine idling switch and the output signal from said brake switch.

5. A shift control apparatus according to claim 1, further comprising means for inhibiting a fuel cut function for stopping a fuel supply to the engine, while the vehicle is decelerated such that the automatic transmission is shifted down to the low-speed gear position.

6. A shift control apparatus according to claim 1, wherein said shift control means utilizes an opening angle of a throttle valve in an intake pipe of the engine, as said currently required output of the engine.

7. A shift control apparatus according to claim 1, further comprising:

idling speed control means for raising an idling speed of said engine to an elevated level which is higher than a normal level by an amount determined by an additional load applied to the engine, said idling speed control means maintaining said idling speed at said normal level when said additional load is not applied to said engine; and shift-down point changing means for shifting, in response to a rise in said idling speed to said elevated level by said idling speed control means, a shift-down point of said speed of the engine which is defined by said predetermined shift control pattern and at which the transmission is shifted down from said high-speed gear position to said low-speed gear position, said shifting of said shift-down point being from a first shift-down point corresponding to said normal level of the idling speed up to a second shift-down point corresponding to said elevated level.

8. A shift control apparatus for an automatic transmission of a motor vehicle having an engine, including shift control means for automatically shifting the automatic transmission according to a predetermined shift control pattern, on the basis of a speed of the engine and a currently required output of the engine, the automatic transmission being placed in a selected one of a plurality of gear positions which include a low-speed gear position that is established by a shifting action including engagement of a one-way clutch, and a high-speed gear position that is established by a shifting action including engagement of a frictional coupling device, said low-speed gear position having a larger speed reduction ratio than said high-speed gear position, wherein the improvement comprises:

idling speed control means for raising an idling speed of said engine to an elevated level which is higher than a normal level by an amount determined by an additional load applied to the engine, said idling speed control means maintaining said idling speed at said normal level when said additional load is not applied to said engine; and shift-down point changing means for shifting, in response to a rise in said idling speed to said elevated level by said idling speed control means, a shift-down point of said speed of the engine which is defined by said predetermined shift control pattern and at which the transmission is shifted down from said high-speed gear position to said low-speed gear position, said shifting of said shift-down point being from a first shift-down point corresponding to said normal level of the idling speed up to a second shift-down point corresponding to said elevated level.

9. A shift control apparatus according to claim 8, wherein said idling speed control means comprises an idling speed control valve which controls an amount of an intake air supplied to the engine.

10. A shift control apparatus according to claim 8, wherein said additional load is applied to the engine when an air conditioner of the vehicle is activated.

11. A shift control apparatus according to claim 8, wherein said additional load is applied to the engine when an operating temperature of said engine is lower than a predetermined level.

12. A shift control apparatus according to claim 8, wherein said plurality of gear positions produce a plurality of speed reduction ratios, and wherein said low-speed gear position consists of a 1st-speed position having a largest speed reduction ratio which is established before the vehicle is stopped, said high-speed gear position consisting of a 2nd-speed position which has the next smaller speed reduction ratio of said plurality of speed reduction ratios than the 1st-speed position, said shift control means shifting up the automatic transmission from the 1st-speed position to the 2nd-speed position.

* * * * *